(12) United States Patent
Tian et al.

(10) Patent No.: US 8,231,355 B2
(45) Date of Patent: Jul. 31, 2012

(54) LINEAR MOTOR CONTROLLER IMPROVEMENTS

(75) Inventors: Zhuang Tian, Auckland (NZ); John H. Boyd, Jr., Holland, MI (US)

(73) Assignee: Fisher & Paykel Appliances Limtied, Auckland (NZ)

( * ) Notice: Subject to any disclaimer, the term of this patent is extended or adjusted under 35 U.S.C. 154(b) by 1065 days.

(21) Appl. No.: 10/569,747

(22) PCT Filed: Sep. 2, 2004

(86) PCT No.: PCT/NZ2004/000208
§ 371 (c)(1),
(2), (4) Date: Nov. 1, 2006

(87) PCT Pub. No.: WO2005/021966
PCT Pub. Date: Mar. 10, 2005

(65) Prior Publication Data
US 2007/0152512 A1    Jul. 5, 2007

(30) Foreign Application Priority Data
Sep. 2, 2003  (NZ) .......................... 527999

(51) Int. Cl.
*F04B 49/06*    (2006.01)
(52) U.S. Cl. .................. 417/44.1; 417/12; 318/135
(58) Field of Classification Search ............ 417/12, 417/44.1; 318/127, 135; 310/12, 13, 15
See application file for complete search history.

(56) References Cited

U.S. PATENT DOCUMENTS

| | | | |
|---|---|---|---|
| 3,886,419 A | 5/1975 | Omura et al. | |
| 4,036,018 A | 7/1977 | Beale | |
| 4,179,899 A | 12/1979 | Katayama | |
| 4,283,920 A | 8/1981 | Kainuma et al. | |
| 4,291,258 A | 9/1981 | Clark et al. | |
| 4,320,448 A | 3/1982 | Okuda et al. | |
| 4,346,318 A | 8/1982 | Shtrikman | |
| 4,349,757 A | 9/1982 | Bhate | |
| 4,602,174 A | 7/1986 | Redlich | |

(Continued)

FOREIGN PATENT DOCUMENTS

DE    3819021    12/1988

(Continued)

OTHER PUBLICATIONS

U.S. Appl. No. 11/226,675, filed Sep. 14, 2005, from U.S. Appl. No. 60/615,502, filed Oct. 1, 2004, "Linear Compressor Controller", Inventors: McGill et al.

*Primary Examiner* — Charles Freay
*Assistant Examiner* — Patrick Hamo
(74) *Attorney, Agent, or Firm* — Clark Hill PLC

(57) ABSTRACT

A free piston gas compressor has a cylinder, a piston, the piston reciprocable within the cylinder in alternating compression and expansion strokes. A reciprocating linear electric motor is drivably coupled to the piston. A controller is programmed to control or adjust power input to the linear motor on the basis of a relationship including at least one of the present compression stroke or expansion stroke durations, the relationship being indicative of the top dead center (TDC) position of the piston, including in the absence of any collision.

In the preferred embodiment the controller obtains a measure reflecting the difference between the compression stroke duration and the expansion stroke duration and adjusts the power input in response to the obtained measure.

16 Claims, 5 Drawing Sheets

U.S. PATENT DOCUMENTS

| | | | |
|---|---|---|---|
| 4,736,595 | A | 4/1988 | Kato |
| 4,836,757 | A | 6/1989 | Curwen et al. |
| 4,838,771 | A | 6/1989 | Kikuchi |
| 4,854,833 | A | 8/1989 | Kikuchi et al. |
| 4,857,814 | A | 8/1989 | Duncan |
| 5,045,748 | A | 9/1991 | Ahlgren et al. |
| 5,055,011 | A | 10/1991 | Mori |
| 5,092,748 | A | 3/1992 | Simmons, II |
| 5,342,176 | A * | 8/1994 | Redlich ............ 417/212 |
| 5,496,153 | A | 3/1996 | Redlich |
| 5,525,845 | A | 6/1996 | Beale et al. |
| 5,592,057 | A | 1/1997 | Kordik |
| 5,592,257 | A | 1/1997 | Sakamoto et al. |
| 5,613,259 | A | 3/1997 | Craft et al. |
| 5,656,896 | A | 8/1997 | Ogiwara et al. |
| 5,658,132 | A | 8/1997 | Akazawa et al. |
| 5,742,492 | A | 4/1998 | Akazawa et al. |
| 5,907,201 | A | 5/1999 | Hiterer et al. |
| 5,945,748 | A | 8/1999 | Park et al. |
| 5,955,799 | A | 9/1999 | Amaya et al. |
| 5,980,211 | A | 11/1999 | Tojo et al. |
| 6,074,172 | A | 6/2000 | Huang |
| 6,077,054 | A | 6/2000 | Lee et al. |
| 6,289,680 | B1 | 9/2001 | Oh et al. |
| 6,437,524 | B1 | 8/2002 | Dimanstein |
| 6,501,240 | B2 | 12/2002 | Ueda et al. |
| 6,506,030 | B1 | 1/2003 | Kottke |
| 6,536,326 | B2 | 3/2003 | Unger et al. |
| 6,657,326 | B1 | 12/2003 | Yamamoto et al. |
| 6,663,348 | B2 * | 12/2003 | Schwarz et al. ............ 417/12 |
| 6,685,438 | B2 | 2/2004 | Yoo et al. |
| 6,809,434 | B1 | 10/2004 | Duncan et al. |
| 6,812,597 | B2 | 11/2004 | McGill et al. |
| 6,815,847 | B2 | 11/2004 | Duncan et al. |
| 6,864,647 | B2 | 3/2005 | Duncan et al. |
| 6,954,040 | B2 | 10/2005 | McGill et al. |
| 2003/0010046 | A1 * | 1/2003 | Freund et al. ............ 62/222 |
| 2003/0021693 | A1 * | 1/2003 | Schwarz et al. ............ 417/12 |
| 2005/0168179 | A1 | 8/2005 | McGill et al. |

FOREIGN PATENT DOCUMENTS

| | | |
|---|---|---|
| DE | 10341758 | 3/2004 |
| EP | 0246468 | 11/1987 |
| EP | 0483447 | 5/1992 |
| EP | 0619639 | 10/1994 |
| EP | 0652632 | 5/1995 |
| EP | 0726394 | 8/1996 |
| EP | 0766005 | 4/1997 |
| EP | 0909896 | 4/1999 |
| EP | 0952347 | 10/1999 |
| GB | 2206931 | 1/1989 |
| GB | 2219047 | 11/1989 |
| GB | 2354557 | 3/2001 |
| JP | 06235352 | 8/1994 |
| JP | 09250449 | 3/1996 |
| JP | 2003065244 | 3/2003 |
| SU | 792511 | 12/1980 |
| WO | WO98/35428 | 8/1998 |
| WO | WO00/16482 | 3/2000 |
| WO | WO00/26536 | 5/2000 |
| WO | WO00/79671 | 12/2000 |
| WO | WO01/29444 | 4/2001 |
| WO | WO01/48379 | 7/2001 |
| WO | WO01/79671 | 10/2001 |
| WO | WO02/35093 | 5/2002 |
| WO | WO03/044365 | 5/2003 |

* cited by examiner

LINEAR MOTOR CONTROLLER IMPROVEMENTS

FIELD OF INVENTION

This invention relates to a controller for a linear motor used for driving a compressor and in particular but not solely a refrigerator compressor.

SUMMARY OF THE PRIOR ART

Linear compressor motors operate on a moving coil or moving magnet basis and when connected to a piston, as in a compressor, require close control on stroke amplitude since, unlike more conventional compressors employing a crank shaft, stroke amplitude is not fixed. The application of excess motor power for the conditions of the fluid being compressed may result in the piston colliding with the cylinder head in which it is located.

In International Patent Publication No. WO 00/79671 the applicant has disclosed a control system for free piston compressor which limits motor power as a function of a property of the refrigerant entering the compressor. However in some free piston refrigeration systems it may be useful to detect an actual piston collision and then to reduce motor power in response. Such a strategy could be used purely to prevent compressor damage, when excess motor power occurred for any reason, or can be used as a way of ensuring high volumetric efficiency. Specifically in relation to the latter, a compressor could be driven with power set to just less than was found to cause piston collisions, to ensure the piston operated with minimum head clearance volume. Minimising head clearance volume leads to increased volumetric efficiency.

In International Patent Publication No. WO 03/44365 we taught a system for detecting piston collision when it occurs. The described system includes monitoring the half period times with a rapid reduction in the half period times indicating a collision having occurred. Subsequent reduction of the input power to the linear motor leaves the compressor running in a state of high volumetric efficiency and clear of the head.

However the control scheme described in WO 03/44365 requires actual collisions to occur which is detrimental to the long term performance of the compressor. Furthermore it is difficult to determine how much to reduce the driving current to ensure efficient operation without collisions. To lower the risk of collisions an overly conservative adjustment may be made.

SUMMARY OF THE INVENTION

It is an object of the present invention to provide controller improvements which go someway to overcoming these disadvantages or which will at least provide the industry with a useful choice.

Accordingly in one aspect the invention consists in a free piston gas compressor comprising:
 a cylinder,
 a piston,
 said piston reciprocable within said cylinder in alternating compression and expansion strokes,
 a reciprocating linear electric motor drivably coupled to said piston having at least one excitation winding, and
 a controller programmed to:
 control or adjust power input to the linear motor on the basis of a relationship including at least one of the present compression stroke or expansion stroke duration, the relationship being indicative (directly or indirectly) of the TDC position of the piston, including in the absence of any collision.

This may for example be the difference between a single stroke and its immediate neighbour, or may be a short term average, the maximum, minimum or median of several strokes, with the several strokes being every second stroke.

In a further aspect the invention consists in a free piston gas compressor comprising:
 a cylinder,
 a piston,
 said piston reciprocable within said cylinder in alternating compression and expansion strokes,
 a reciprocating linear electric motor drivably coupled to said piston having at least one excitation winding, and
 control means for controlling or adjusting power input to the linear motor on the basis of a relationship including at least one of the present compression stroke or expansion stroke duration, the relationship being indicative (directly or indirectly) of the TDC position of the piston, including in the absence of any collision.

According to a further aspect the present invention consists in a method of control for a free piston linear compressor including controlling or adjusting power input to the linear motor on the basis of a relationship including at least one of the present compression stroke or expansion stroke duration, the relationship being indicative (directly or indirectly) of the TDC position of the piston, including in the absence of any collision.

According to a further aspect the present invention consists in a method of control of a free piston linear compressor including determining that the piston TDC is proximate to the head for a given historical cycle by observing the duration of the compression stroke or expansion stroke relative to other measured durations.

According to a further aspect the present invention consists in a method of control of a free piston linear compressor including controlling the power input to the linear motor based on a relation including the time duration of the compression stroke independently of the time duration of the expansion stroke.

According to a further aspect the present invention consists in a method of control of a free piston linear compressor including controlling the power input to the linear motor during full capacity operation based on an analysis that is reactive, at least under substantially unchanging operating conditions, to the time duration of the expansion stroke.

According to a further aspect the present invention consists in a method of control of a free piston linear compressor including controlling the power input to the linear motor during full capacity operation based on a comparison of a function or relationship of the time duration of the compression stroke with preset thresholds.

The preferred relationship may be based on the relative durations of the compression stroke and expansion stroke as contributors to the overall full cycle duration. A shortening of the compression stroke independent of any shortening of the expansion stroke indicates piston TDC moving closer to the head. A lengthening of the expansion stroke independent of any lengthening of the compression stroke also indicates piston TDC moving closer to the head.

The relationship may include an absolute or fractional comparison between the compression or expansion stroke durations, or a fractional comparison between one of the compression or expansion stroke durations and the whole cycle period.

Stroke durations may be of a single (for example the most recent) instance or may be an average, median, maximum or minimum of a set of contemporary results. For example each duration may be the average of a previous set of six such durations.

Identification of "compression" or "expansion" strokes as such is not generally necessary. In some formulations it may be necessary, for example where control is on expansion stroke alone it will be necessary, in which case it will generally be sufficient to select the alternating stroke of longer duration.

Control based on the relationship may include continuous or periodic feedback control based on the relationship and/or intermittent adjustment based on trigger values related to a numerical output of the relationship. The feedback control and relationship may for example be simple or weighted functions, fuzzy logic controls or similar. Trigger values may be preset, for example in a look up table, or may be determined by contemporaneous event history, for example following detected collisions between the piston and head. The trigger values may be dependant on one or more independent operating conditions of the compressor. For example in a refrigeration system the trigger values may best be dependant on the suction side pressure or temperature. Where it is dependant on one or more operating conditions the trigger value may be a function of the operating condition or may be a derived from a look-up table containing an array of preset data.

The control preferably includes maintaining an output of the relationship close to but to one side of, and not beyond, a preset trigger or threshold value. Preferably the relationship is the subtraction of one of the expansion stroke duration and compression stroke duration from the other. If this involves subtraction of the expansion stroke duration from the compression stroke duration then the control tries to keep the output above a preset value (which may be negative). If this involves subtraction of the compression stroke duration from the expansion stroke duration then the control tries to keep the output above a preset value, which will not normally be negative.

The control, including evaluation of any relationship and deriving from that an appropriate or adjusted power input for the linear motor, may be implemented entirely in software or in hard electronic logic or in a combination thereof. Preferably it is implemented entirely in software executable on a microprocessor. The relevant output of the microprocessor may be a drive output controlling a connection of the power supply to the linear motor.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense liming.

DESCRIPTION OF THE PREFERRED EMBODIMENTS

The present invention provides a method for controlling a free piston reciprocating compressor powered by a linear electric motor.

While in the following description the present invention is described in relation to a cylindrical linear motor it will be appreciated that this method is equally applicable to linear motors in general and in particular also to flat linear motors, see for example our International Patent Application no. PCT/NZ00/00201 the contents of which are incorporated herein by reference. One skilled in the art would require no special effort to apply the control strategy herein described to any form of linear motor driven free piston compressor.

Figure 1:
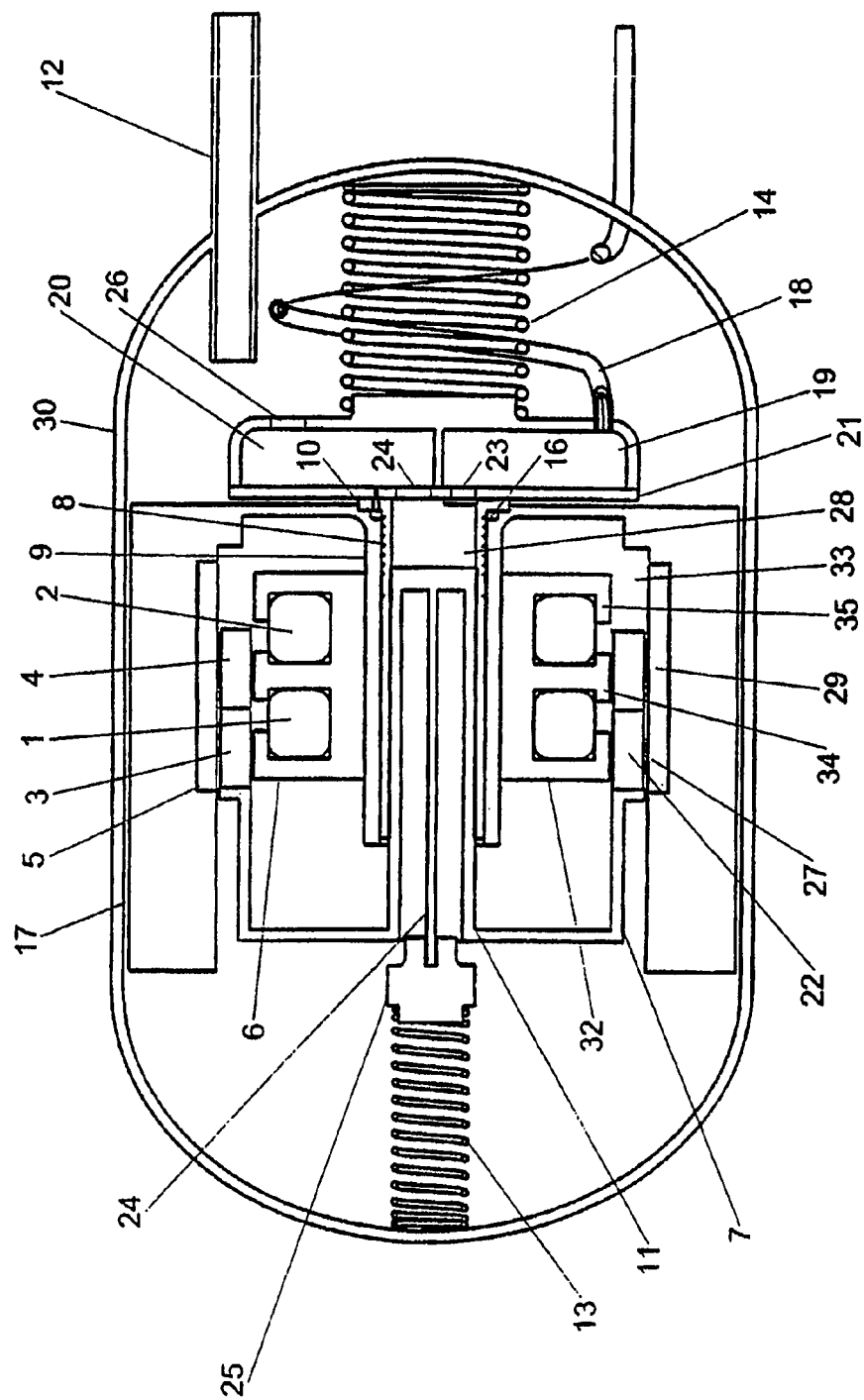
FIG. 1 is a cross-section of a linear compressor.

The compressor shown in FIG. 1, involves a permanent magnet linear motor connected to a reciprocating free piston compressor. The cylinder 9 is supported by a cylinder spring 14 within the compressor shell 30. The piston 11 is supported radially by the bearing formed by the cylinder bore plus its spring 13 via the spring mount 25. The bearings may be lubricated by any one of a number of methods as are known in the art, for example the gas bearing described in our co-pending International Patent Application no. PCT/NZ00/00202, or the oil bearing described in International Patent Publication no. WO00/26536, the contents of both of which are incorporated herein by reference. Equally the present invention is applicable to alternative reciprocation systems. For example while below a compressor is described with a combined gas/mechanical spring system, an entirely gas spring system can be used with the present invention.

The reciprocating movement of piston 11 within cylinder 9 draws gas in through a suction tube 12, through a suction port 26, through a suction muffler 20, and through a suction valve port 24 in a valve plate 21 into a compression space 28. The compressed gas then leaves through a discharge valve port 23, is silenced in a discharge muffler 19, and exits through a discharge tube 18. Wide variations on the flow paths are possible. For example the suction pathway may be through the inside of the piston, with the suction port through the piston crown.

The compressor motor comprises a two part stator 5, 6 and an armature 22. The force which generates the reciprocating movement of the piston 11 comes from the interaction of two annular radially magnetised permanent magnets 3, 4 in the armature 22 (attached to the piston 11 by a flange 7), and the magnetic field in an air gap 33 (induced by the stator 6 and coils 1, 2).

The version of the compressor motor having two coils, shown in FIG. 1, has a current flowing in coil 1, which creates a flux that flows axially along the inside of the stator 6, radially outward through the end stator tooth 32, across the air gap 33, then enters the back iron 5. Then it flows axially for a short distance 27 before flowing radially inwards across the air gap 33 and back into the centre tooth 34 of the stator 6. The second coil 2 creates a flux which flows radially in through the centre tooth 34 across the air gap axially for a short distance 29, and outwards through the air gap 33 into the end tooth 35. The flux crossing the air gap 33 from tooth 32 induces an axial force on the radially magnetised magnets 3,4 provided that the magnetisation of the magnet 3 is of the opposite polarity to the other magnet 4. It will be appreciated that instead of the back iron 5 it would be equally possible to have another set of coils on the opposite sides of the magnets.

An oscillating current in coils 1 and 2, not necessarily sinusoidal, creates an oscillating force on the magnets 3,4 that will give the magnets and stator substantial relative movement provided the oscillation frequency is close to the natural frequency of the mechanical system. This natural frequency is determined by the stiffness of the springs 13, 14, the mass of the cylinder 9 and stator 6 and the additional gas spring effect of the gas within compression space 28. The oscillating force on the magnets 3,4 creates a reaction force on the stator parts. Thus the stator 6 must be rigidly attached to the cylinder 9 by adhesive, shrink fit or clamp etc. The back iron is clamped or bonded to the stator mount 17. The stator mount 17 is rigidly connected to the cylinder 9.

Control Strategy

Experiments have established that a free piston compressor is particularly efficient when driven at the natural frequency of the compressor piston-spring system. However as well as any deliberately provided metal spring, there is an inherent gas spring, the effective spring constant of which varies. The electronically commutated permanent magnet motor already described, is preferably controlled using techniques including those derived from the applicant's experience in electronically commutated permanent magnet motors as disclosed in International Patent Publication no. WO00/79671 for example, the contents of which are incorporated herein by reference.

When the linear motor is controlled as described in WO00/79671 it is possible that the compressor input power increases to a level where the excursion of the piston results in a collision with the valve plate enclosing the end of the cylinder. In our International Patent Publication WO 03/44365 we taught a system for detecting collisions. When collision occurs the piston reciprocation period is observed to fall compared to a filtered or smoothed value. The piston period is made up of two half periods between bottom dead centre and top dead centre and, the half periods are not symmetrical. The half period moving away from the head is longer than the half period moving towards the head, although both half periods are reduced in time whenever a piston collision occurs. In the preferred embodiment of the present invention a collision detector is provided by monitoring the half period times for any rapid fall in the half period times, which indicates a collision, and the input power is reduced in response.

According to the present invention we have devised a system for determining proximity of piston TDC to the valve plate. We have found that the TDC position relative to the head influences the relative duration of each of the expansion and compression strokes. TDC positions closer to the head reduce the duration of the compression stroke compared with TDC positions further away from the head. TDC positions closer to the head increase the duration of the expansion stroke compared with TDC positions further away from the head. We have recognised that this can be used as the basis for a stroke control that runs the linear compressor with a TDC position maintained close to the head (when necessary for high output operation) with a significant reduction in collision occurrence. This is maintained without requiring a proximity or absolute position sensor for the piston. This may be provided in conjunction with a collision detector as described in WO 03/44365, both being implementable in software and sharing common input data. Other collision detection systems may also be included, for example a microphone detecting the noise of collision.

The preferred stroke control calculates a time difference Δt from the duration of the compression stroke, $t_C$, and the duration of the expansion stroke, $t_E$ as:

$$\Delta t = t_C - t_E$$

Although this may be calculated for every cycle it could for example be the difference between a single stroke and its immediate neighbour, or may be a short term average, the maximum, minimum or median of several strokes, with the several strokes being every second stroke.

Δt is calculated at intervals and compared with a threshold value read from a lookup table stored in non-volatile memory. The lookup table provides threshold values for varying operating conditions, most particularly the compressor suction pressure, which in a refrigeration system, is essentially the evaporating pressure and is related to the evaporating temperature which is most easily measured.

The lookup table can be predetermined for a given compressor and refrigeration system design and preloaded into all controllers for use in accordance with that design. Alternatively the lookup table can be generated for each individual compressor in a calibration procedure including slowly increasing power under a variety of operating conditions and developing threshold by increasing power until a collision occurs and is detected using the collision detecting arrangements such as that described herein, and basing the threshold on the Δt observed immediately prior to the collision.

As an alternative to a lookup table we may intermittently derive a threshold value during normal running of the compressor. For example a threshold deriving procedure may be intermittently repeated. This procedure may include monitoring the Δt while ramping up the power input steadily until a collision is detected, and subsequently adopting as a controlling threshold a Δt observed shortly prior to the collision occurring.

The control scheme described above is the applicant's preferred embodiment of the present invention. However other implementations are possible without departing from the general scope of the present invention in its broadest aspect. Other control algorithm may be derived to make use of the observed changes in the compression stroke duration and/or expansion stroke duration to control power input to the compressor to a level achieving maximum clearance without collisions.

A first additional example might use a comparison of the compression stroke duration to a whole cycle duration.

Another example would be a comparison of an expansion stroke duration with a whole cycle duration.

In each case the respective half cycle duration and the whole cycle duration may be an average duration of more than one such half cycle or full cycle. For example an average of the preceding six instances may be appropriate. Alternatively, a maximum, minimum or median duration may be identified from a contemporary set (for example preceding six instances) and used for the subsequent control.

The calculated relationship between compared observations may be subject to considerable variation. For example rather than a time difference being calculated a ratio may be calculated such as the ratio of compression stroke duration to expansion stroke duration or the ratio of expansion stroke duration to full cycle duration. Other functions may also suggest themselves to persons skilled in the art that meet the necessary criteria of being reactive, under substantially unchanged refrigeration system conditions, to changes in the duration of the compression stroke and/or duration of the expansion stroke.

Potential control algorithms have been described briefly above which effectively provide a relationship between the compression stroke duration and the expansion stroke duration. This has been found to provide a reasonable degree of independence from refrigeration system conditions. Effective control has been achieved by the inventors under realistic operating conditions using only sensing of the suction pressure as a look-up table index. It is expected that effective control may also be achieved using only monitoring of one of the expansion stroke and compression stroke, with comparison of the respective stroke with a value from a look-up table, or similar relationship such as comparison of a function of the compression or expansion stroke with a constant value.

It is considered that this is likely to be particularly effective in respect of the expansion stroke duration which exhibits a much greater increase than the decrease that it is exhibited in the compression stroke duration.

Figure 2:
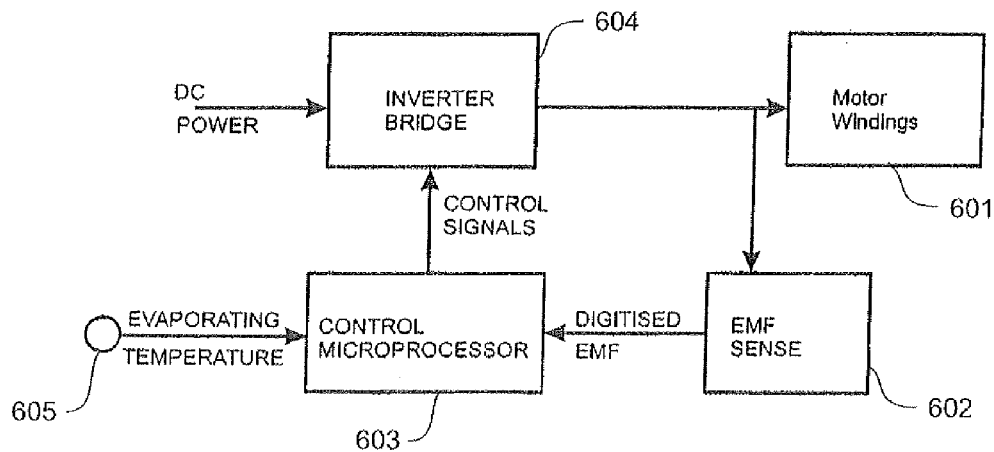
FIG. 2 is a block diagram of a free piston vapour compressor and associated controller which may implement the present invention.

In the preferred controller shown in block form in FIG. 2, back EMF detection is used to detect the period of a full cycle and the period of each stroke. An EMF sensor 602 is connected in parallel with the motor windings 601. The EMF sensor 602 provides a digital output representative of the EMF across the motor windings. The digitised EMF output of the EMF sensor 602 is provided as an input to control microprocessor 603. A temperature sensor fixed to the refrigerant evaporator provides an output signal indicative of the evaporating temperature. This signal is digitised and provided to the control microprocessor 603 as a further input. The control microprocessor 603 develops control signals based on the digitised EMF and evaporating temperature inputs and provides control signals to an inverter bridge 604. The inverter bridge switches power to the motor windings 601 on the basis of the control signals from control microprocessor 603. The general control program for the control microprocessor 603 is described in applicant's patent publication WO 00/79671.

Figure 4:
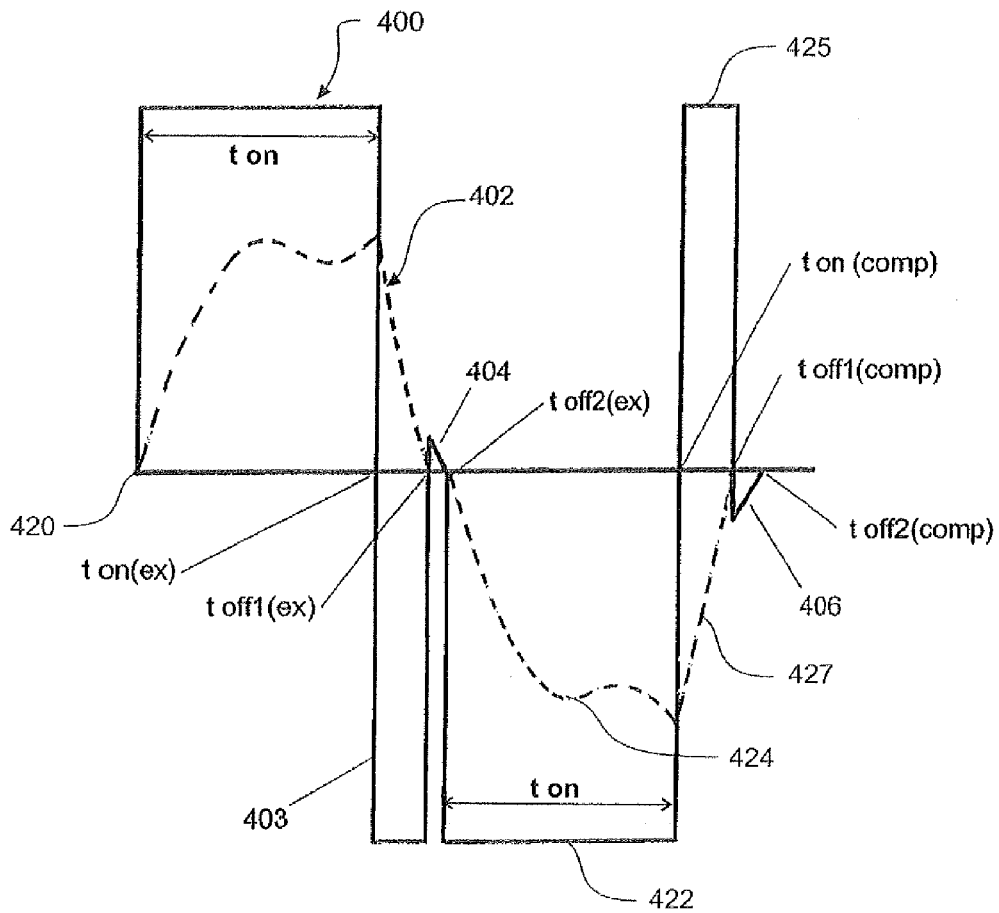
FIG. 4 is an example plot of current and voltage versus time for a full compressor cycle.
Figure 6:
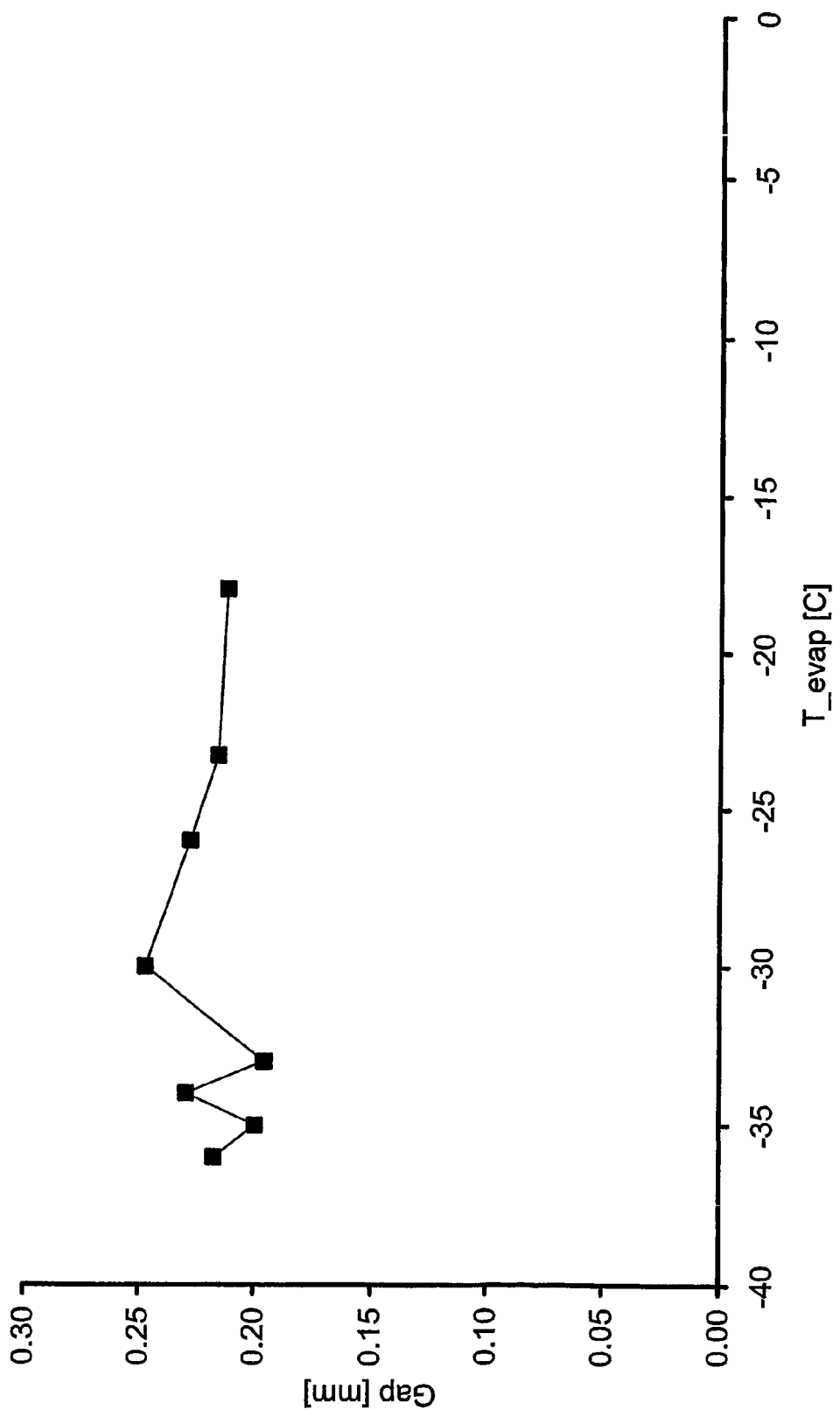
FIG. 6 is a plot of minimum head clearance ("gap") versus evaporating temperature ($T_{evap}$) for a prototype linear compressor executing a control as herein described.

For the purpose of implementing the preferred embodiment of the present invention and implementing collision detection as described in WO 03/044365, the control microprocessor implements a stroke period determining algorithm. The stroke period determining algorithm determines the duration of each compression and expansion stroke by monitoring the digitised EMF signals received from EMF sensor 602. The algorithm determines the stroke period as the time period between back EMF zero crossings. FIG. 4 illustrates example waveforms in a linear motor operated in accordance with the control method described in WO 00/79671. One waveform represents the motor winding voltage 400. The other waveform represents the motor current 402. The figure illustrates the waveforms through a single full period including both an expansion stroke and a compression stroke. In this period the motor is being energised in each half cycle for a controlled time, $t_{on}$. The stator winding voltage is turned on at the beginning 420 of the expansion stroke. Motor current 402 builds up while the voltage is applied. The stator winding voltage is removed at time $t_{on\,(ex)}$. With the voltage removed the current 402 decays to zero between times $t_{on(ex)}$ and $t_{off1(ex)}$. The decaying current forces the stator winding voltage fully negative during this decay. For the remainder of the expansion stroke the motor winding EMF is the back EMF 404 induced by motion of the armature. The EMF 404 decays to zero as the armature reaches its position farthest from the head (referred to as bottom dead centre or BDC) at the end of the expansion stroke. The zero crossing $t_{off2(ex)}$ indicates the moment of the end of the expansion stroke and beginning of the compression stroke. With the beginning of the compression stroke a driving voltage 422 is applied to the motor winding and the current begins to rise as indicated by current curve 424. After a time $t_{on(comp)}$ has elapsed (point $t_{on(comp)}$ in FIG. 6) the driving voltage is removed. With the driving voltage removed the current falls as indicated at 427 and the stator winding voltage is forced fully positive as at 425. Once the current has reduced to zero at $t_{off1(comp)}$ the EMF 406 represents the induced back EMF in the winding. The induced back EMF 406 falls to zero as the armature velocity decreases in approaching its position closest to the head (referred to as top dead centre or TDC). At TDC the armature velocity is momentarily zero before reversing and a back EMF zero crossing occurs at $t_{off2(comp)}$.

The stroke period determining algorithm executed in control microprocessor 603 is programmed to discern the zero crossing points $t_{off2(ex)}$ and $t_{off2(comp)}$. The time duration between consecutive zero crossing points, without discriminating between expansion and compression, indicates each single stroke duration, with the stroke durations alternating between compression stroke duration and expansion stroke duration. The stroke period determining algorithm has two outputs. One indicates the occurrence of a zero crossing event. The other indicates the most recent stroke duration.

Figure 3:
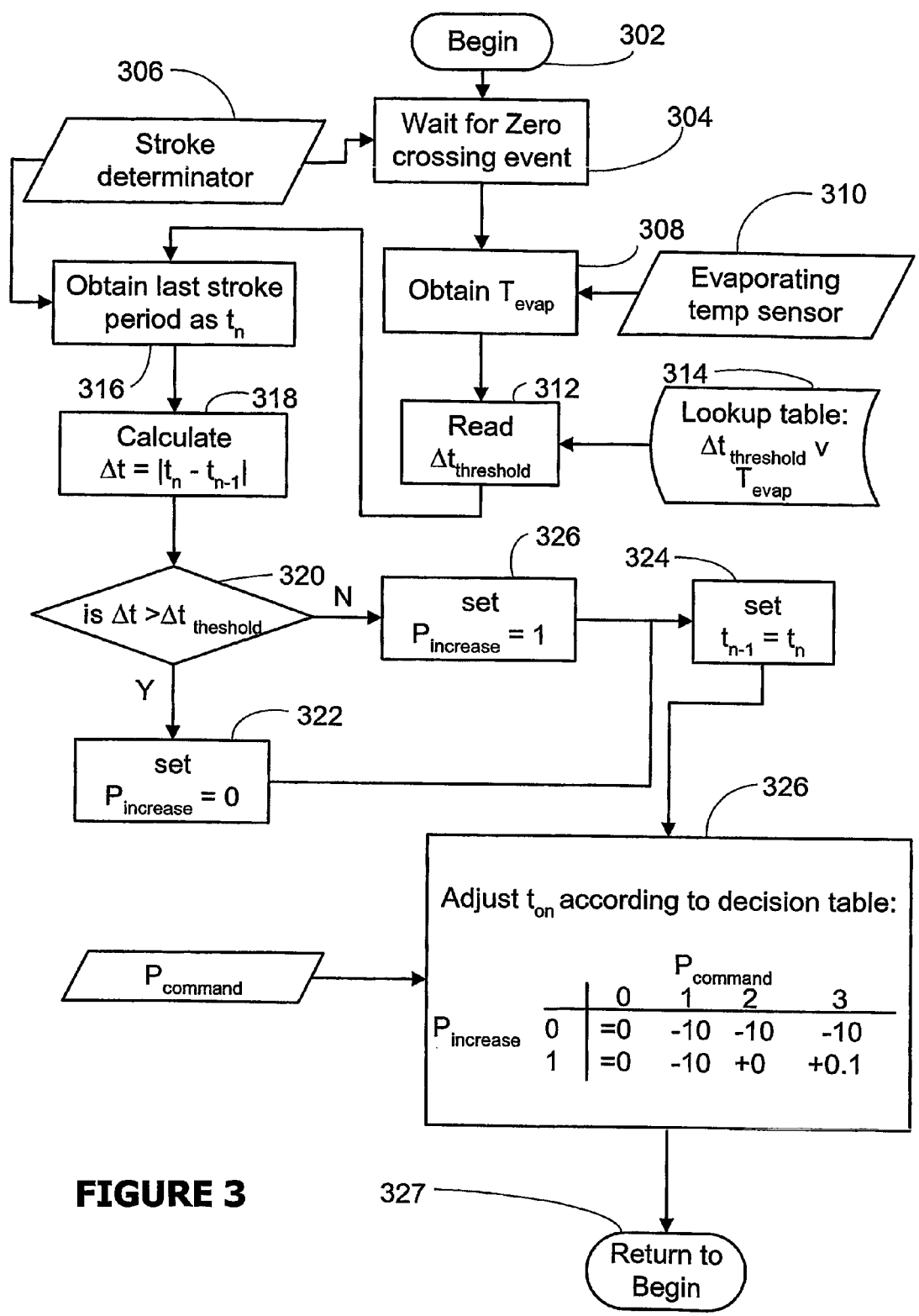
FIG. 3 is a flow diagram showing the stroke controller process according to a preferred embodiment of the present invention.

The control microprocessor 603 executes an algorithm to continually adjust the energisation time, $t_{on}$. The process is illustrated in FIG. 3. The process takes as inputs the output of the stroke determinator the output of an evaporator temperature sensor and an indicator of compressor demand, $P_{command}$. $P_{command}$ is determined elsewhere by the microprocessor, or elsewhere in an overall refrigerator controller, on the basis of the refrigerator operating conditions. Essentially it is related to the requested capacity to be delivered by the compressor. In the illustrated example $P_{command}$ can take one of four values. The value "0" equates to an immediate halt of the compressor. The value "1" equates to an incremental reduction in capacity. The value "2" equates to maintaining capacity at the existing level and the value "3" equates to incrementally increasing capacity. Changing the capacity is achieved by a corresponding increase or decrease in the duration, $t_{on}$, of energisation in each half cycle. For the purpose of this control $t_{on}$ is a variable whose value is the duration (in ms) of energisation.

Figure 5:
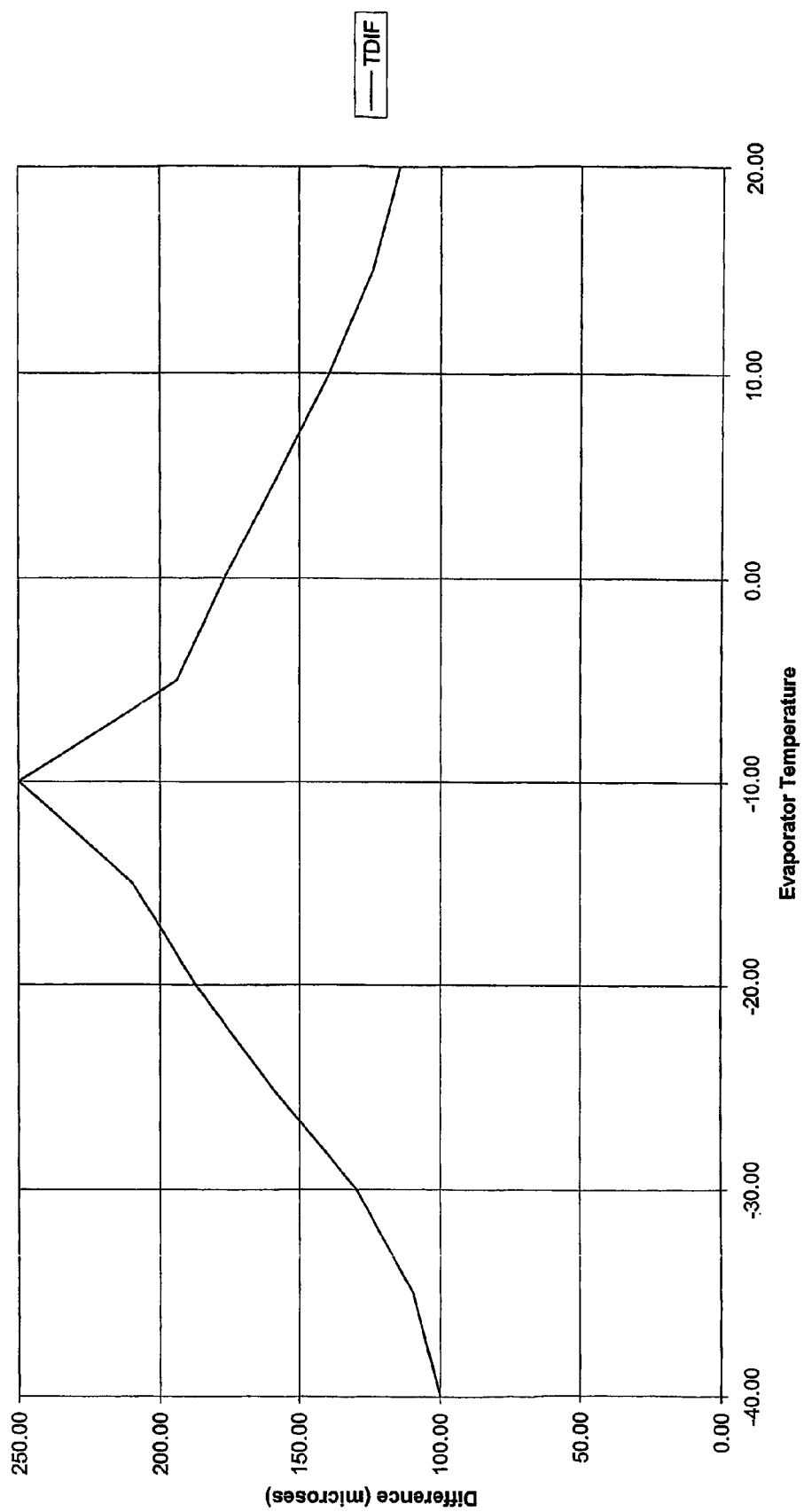
FIG. 5 is a chart illustrating the threshold valve lookup table used by the process of FIG. 3.

Therefor referring to FIG. 3 the preferred method includes a continuously repeated loop beginning at step 302. At the beginning of each loop the method waits at step 304 for a zero crossing event to be indicated by the stroke determining algorithm 306. The zero crossing event acts as an interrupt leading to continued execution of the $t_{on}$ control loop, so that the loop executes once for every half cycle. When the zero crossing event is indicated by the stroke determinator 306 the method proceeds, at step 308, to obtain a reading of the evaporating temperature from evaporating temperature sensor 310. Then proceeding to step 312 a threshold value ($\Delta t_{threshold}$) for $\Delta t$ is read in from a lookup table 314. The lookup table 314 records $\Delta t$ threshold values as a function of evaporator temperature. A plot illustrating an example "$\Delta t$ threshold value versus evaporator temperature" lookup table is provided as FIG. 5.

At step 316 the last stroke period is obtained from stroke determinator 306 and assigned to variable $t_n$. Proceeding to step 318, $\Delta t$ is calculated as the absolute value of the difference between the most recently read stroke period, $t_n$, and the immediately previous stroke period, $t_{n-1}$. The program proceeds to decision step 320 where $\Delta t$ calculated in step 318 is compared with $\Delta t_{threshold}$ read from lookup table 314 at step 312.

If $\Delta t$ is greater than $\Delta t_{threshold}$ the algorithm proceeds to step 322. If $\Delta t$ is greater than the threshold this indicates that the compressor is running close to maximum capacity. Accordingly at step 322 a variable $P_{increase}$ is set to "0". The algorithm then proceeds to step 324.

If at step 320 Δt is not greater than Δt$_{threshold}$ the algorithm proceeds to step 326. If Δt is less than or equal to the threshold this indicates that the compressor is not yet running with minimum head clearance and more capacity is available. Accordingly variable P$_{increase}$ is set to 1. The algorithm then proceeds to step 324.

At step 324 variable t$_{n-1}$ is set to the value of t$_n$. This is for use in the next iteration of the loop.

The algorithm then proceeds to step 326 where the duty time t$_{on}$ is adjusted. An adjustment for t$_{on}$ is found from a decision table looked up on the basis of two variables P$_{command}$ and P$_{increase}$. As discussed earlier the P$_{command}$ input indicates the requested compressor operating change. The P$_{increase}$ variable, set earlier in the algorithm, indicates whether the compressor is already running at capacity, zero indicating no additional capacity. Accordingly where P$_{increase}$ equals 1 there is additional capacity available and the t$_{on}$ adjustment corresponds with the adjustment requested by P$_{command}$ In the case of our preferred small capacity, high running frequency compressor, we adjust t$_{on}$ down by 10 μs, not at all, or up by 0.1 μs, as indicated. Where P$_{increase}$ equals zero this indicates no additional capacity is available and the piston may be traversing into positions close to collision. Accordingly the t$_{on}$ adjustment is independent of P$_{command}$ and in all cases reduces the t$_{on}$ duration, for example by 10 μs.

Having made the t$_{on}$ adjustment at step 326 the algorithm proceeds to return, at step 327, to the beginning step 302 and reiterate the loop.

It will be apparent that in operation, where the overall controller requires maximum capacity from the compressor (such as when product is added to a refrigeration compartment) P$_{command}$ will be constantly set as 3. This will lead to t$_{on}$ building (by 0.1 μs each half period) until Δt is greater than the Δt$_{threshold}$ for the evaporating temperature sensed by evaporating temperature sensor 310. Once Δt is greater than the threshold, t$_{on}$ will be adjusted downward (by 10 μs each half period) until Δt is not greater than the threshold. In subsequent iterations t$_{on}$ will be adjusted upward until Δt is greater than the threshold, and so on. This feedback control sees t$_{on}$ fluctuate around a level at which Δt is approximately equal to the threshold value, responding to changes in the evaporating temperature sensed by sensor 310 as and when they occur.

The inventors have tested the algorithm herein described on a prototype linear compressor such as that described in our co-pending New Zealand patent application 526361. The prototype compressor was fitted with a proximity sensor to measure the proximity of the piston to the head at its top dead centre position. The proximity sensor output was analysed and monitored to determine the closest top dead centre position measured over a period of steady state running at a given evaporating temperature while requesting maximum capacity (P$_{command}$=3). The head clearance results for eight evaporating temperatures are plotted in FIG. 5. This indicates that the control achieved a consistent minimum clearance gap of approximately 0.2 mm to 0.25 mm without collisions. This clearance gap was achieved using threshold values in accordance with the chart of FIG. 5. The threshold values of the chart of FIG. 5 were selected for an intended clearance gap of 0.2 mm.

As referred to earlier, a collision detector may also be implemented in the software stored in microprocessor 603. The collision detector would receive the electrical period data and detect rapid reductions in the period of a full cycle as piston collisions with the cylinder head. The collision detector may modify the t$_{on}$ value independently of the control algorithm of FIG. 3, or may be integrated into that control algorithm.

While in the preferred embodiment of the present invention the control algorithm and the stroke determinator have been described as implemented in software executed by the control microprocessor 603 they could equally be implemented partially or fully in external logic, distributed in more than one module, or implemented in discrete analogue circuitry. What has been described is a preferred implementation of the present invention. Further implementations of the present invention will be obvious to persons skilled in the art without departing from the general principles, which, are within the intended scope of the present patent application in its broadest form.

The invention claimed is:

1. A free piston gas compressor comprising:
    a cylinder,
    a piston,
    said piston reciprocable within said cylinder in alternating compression and expansion strokes,
    a reciprocating linear electric motor drivably coupled to said piston having at least one excitation winding, and
    a controller programmed to obtain a measure reflecting one or the other of a duration of the compression stroke and a duration of the expansion stroke and to control or adjust power input to the linear motor on the basis of a relationship including at least one of the present compression stroke duration or expansion stroke duration, the relationship being indicative (directly or indirectly) of the TDC position of the piston including in the absence of an collision, said controller is programmed to obtain a measure reflecting each of the compression stroke duration and the expansion stroke duration and to execute the steps of:
    obtaining a measure reflecting the difference between the compression stroke duration and the expansion stroke duration,
    adjusting the power input to said excitation winding in response to the obtained measure.

2. A free piston gas compressor as claimed in claim 1 wherein said controller is programmed to execute the steps of:
    obtaining one or more system variable values,
    accessing data storage to select a prestored threshold value from amongst a plurality of prestored threshold values, based on said obtained system variables, and
    adjusting the power input to said excitation winding in response to a comparison between said obtained measure and said retrieved threshold value.

3. A free piston gas compressor as claimed in claim 2 wherein said compressor includes a suction gases pressure sensor, said controller receives input from said pressure sensor and said controller obtains said system variable value from said pressure sensor input.

4. A free piston gas compressor as claimed in claim 1 wherein said controller includes a back EMF detector and is programmed to obtain a measure reflecting the difference between a compression stroke duration and an expansion stroke duration by executing the steps of:
    obtaining measures of time duration between consecutive back EMF zero crossings, each said time duration between consecutive back EMF zero crossings representing the time duration of a single compression or expansion stroke, and
    calculating the difference in the time durations between alternate strokes.

5. A free piston gas compressor as claimed in claim 1 wherein said motor is an electronically commutated permanent magnet DC motor.

6. A free piston gas compressor as claimed in claim 5 wherein said compressor further comprises back EMF detection means for sampling the back EMF induced in said at least one excitation winding when exciting current is not flowing, and zero crossing detection means connected to the output of said back EMF detection means and means for determining the time interval between output pulses from said zero crossing detection means to thereby determine the time of each half cycle of said piston.

7. A free piston gas compressor as claimed in claim 6 wherein said controller is programmed to calculate the difference in the duration of two successive half cycles of said piston operation, and to control or adjust the power input to the linear motor based on said calculated difference.

8. A free piston gas compressor comprising:
a cylinder,
a piston,
said piston reciprocable within said cylinder in alternating compression and expansion strokes,
a reciprocating linear electric motor drivably coupled to said piston having at least one excitation winding, and
control means for obtaining a measure reflecting one or the other of a duration of the compression stroke and the duration of the expansion stroke and for controlling or adjusting power input to the linear motor on the basis of a relationship including at least one of the present compression stroke duration or expansion stroke duration, the relationship being indicative (directly or indirectly) of the TDC position of the piston, including in the absence of any collision, said control means includes:
means for obtaining a measure reflecting each of the compression stroke duration and the expansion stroke duration and for obtaining a measure of the difference between the compression stroke duration and the expansion stroke duration,
means for adjusting the power input to said excitation winding in response to the obtained measure.

9. A free piston gas compressor as claimed in claim 8 wherein said control means includes:
means for obtaining one or more system variable values,
means for accessing data storage to select a prestored threshold value from amongst a plurality of prestored threshold values, based on said obtained system variables, and
means for adjusting the power input to said excitation winding in response to a comparison between said obtained measure and said retrieved threshold value.

10. A free piston gas compressor as claimed in claim 9 wherein said compressor includes a suction gases pressure sensor, said control means receives input from said pressure sensor and said control means obtains said system variable value from said pressure sensor input.

11. A free piston gas compressor as claimed in claim 8 wherein said control means includes a back EMF detector and said means for obtaining a measure reflecting the difference between a compression stroke duration and an expansion stroke duration includes:
means for obtaining measures of time duration between consecutive back EMF zero crossings, each said time duration between consecutive back EMF zero crossings representing the time duration of a single compression or expansion stroke, and
means for calculating the difference in the time durations between alternate strokes.

12. A free gas piston compressor as claimed in claim 8 wherein said motor is an electronically commutated permanent magnet DC motor.

13. A free gas piston compressor as claimed in claim 12 wherein said compressor further comprises back EMF detection means for sampling the back EMF induced in said at least one excitation winding when exciting current is not flowing, and zero crossing detection means connected to the output of said back EMF detection means and means for determining the time interval between output pulses from said zero crossing detection means to thereby determine the time of each half cycle of said piston.

14. A free gas piston compressor as claimed in claim 13 wherein said means for obtaining a measure includes means for calculating the difference in the duration of two successive half cycles of said piston operation.

15. A method of control for a free piston linear compressor comprising:
obtaining a measure reflecting each of a duration of a compression stroke and a duration of an expansion stroke; and
controlling or adjusting power input to a linear motor of the compressor on the basis of a relationship reflecting the difference between the compression stroke duration and the expansion stroke duration, the relationship being indicative (directly or indirectly) of the TDC position of the piston, including in the absence of any collision.

16. A method of control of a free piston linear compressor comprising:
obtaining a measure reflecting each of a duration of a compression stroke and a duration of an expansion stroke; and
determining that the piston TDC is proximate a head of a linear motor of the compressor for a given historical cycle by observing compression stroke duration relative to the expansion stroke duration.

* * * * *

UNITED STATES PATENT AND TRADEMARK OFFICE
CERTIFICATE OF CORRECTION

PATENT NO. : 8,231,355 B2
APPLICATION NO. : 10/569747
DATED : July 31, 2012
INVENTOR(S) : Zhuang Tian and John H. Boyd, Jr.

It is certified that error appears in the above-identified patent and that said Letters Patent is hereby corrected as shown below:

On the Title page

(73)   Assignee: "Fisher & Paykel Appliances Limtied"

should read -- Fisher & Paykel Appliances Limited --

Signed and Sealed this
Seventh Day of May, 2013

Teresa Stanek Rea
*Acting Director of the United States Patent and Trademark Office*